Jan. 6, 1925.
M. G. HIMOFF
1,522,242
HOBBING MACHINE
Filed Jan. 31, 1921      5 Sheets-Sheet 1
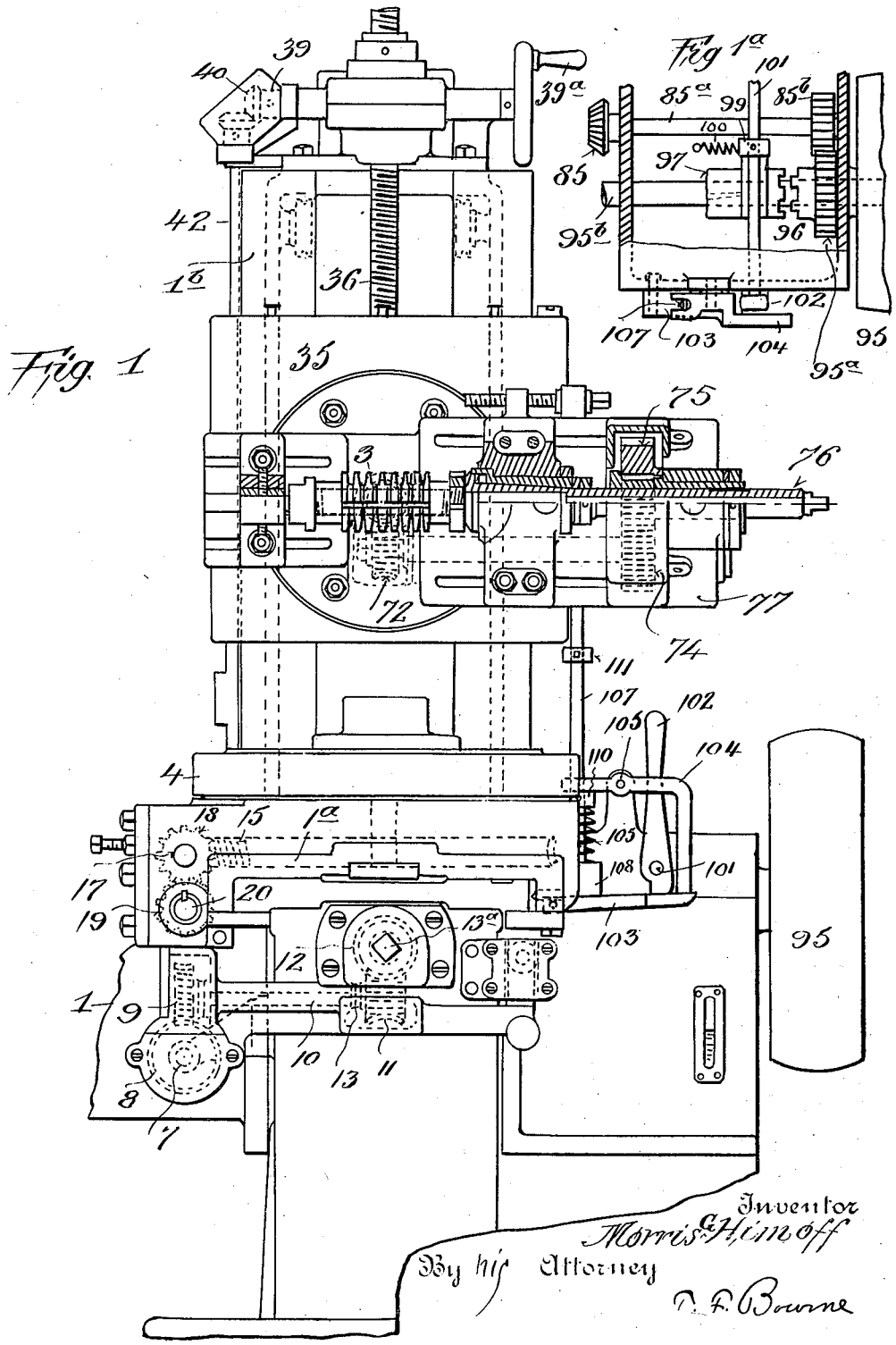
Inventor
Morris G. Himoff
By his Attorney
D. F. Bourne

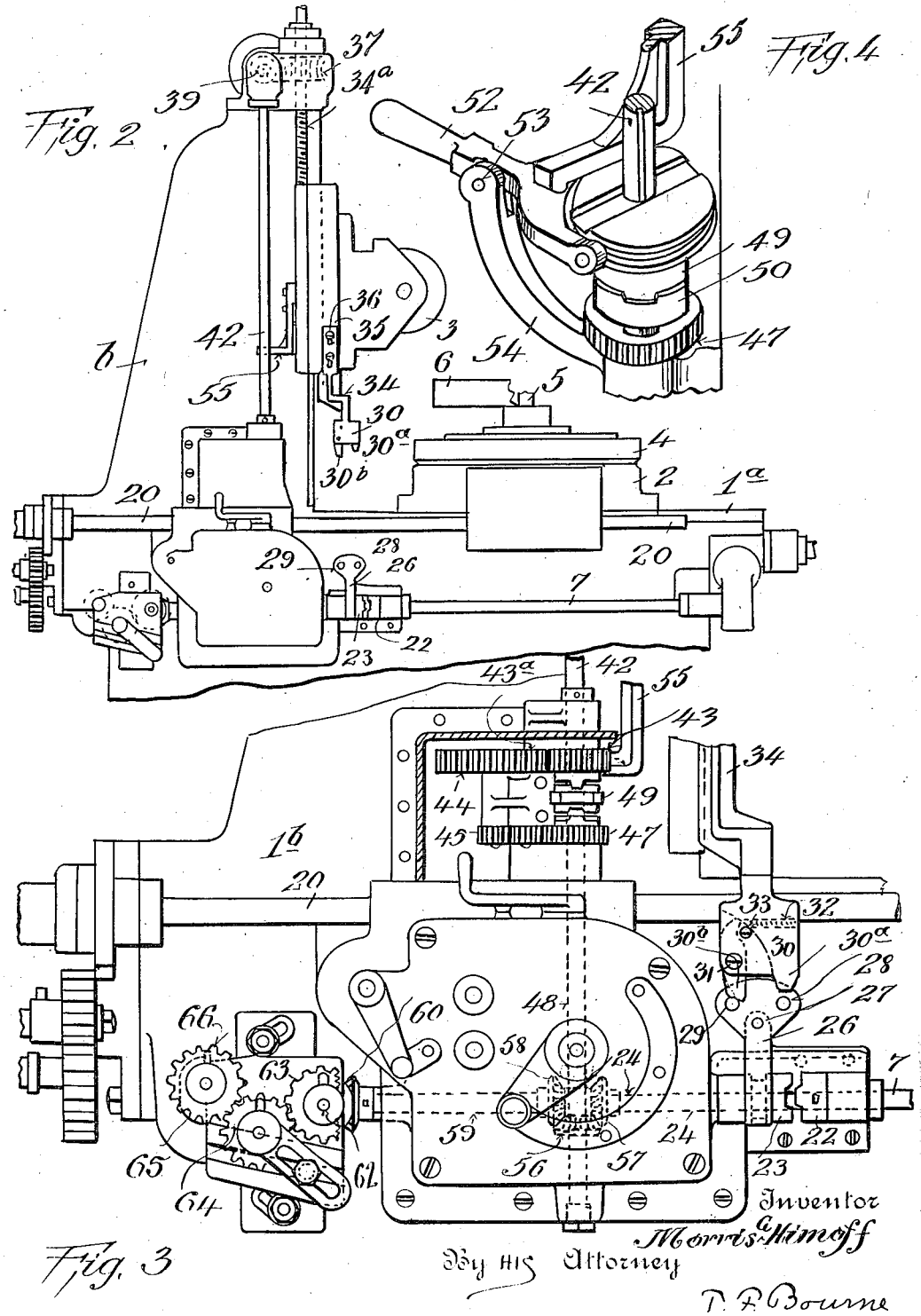

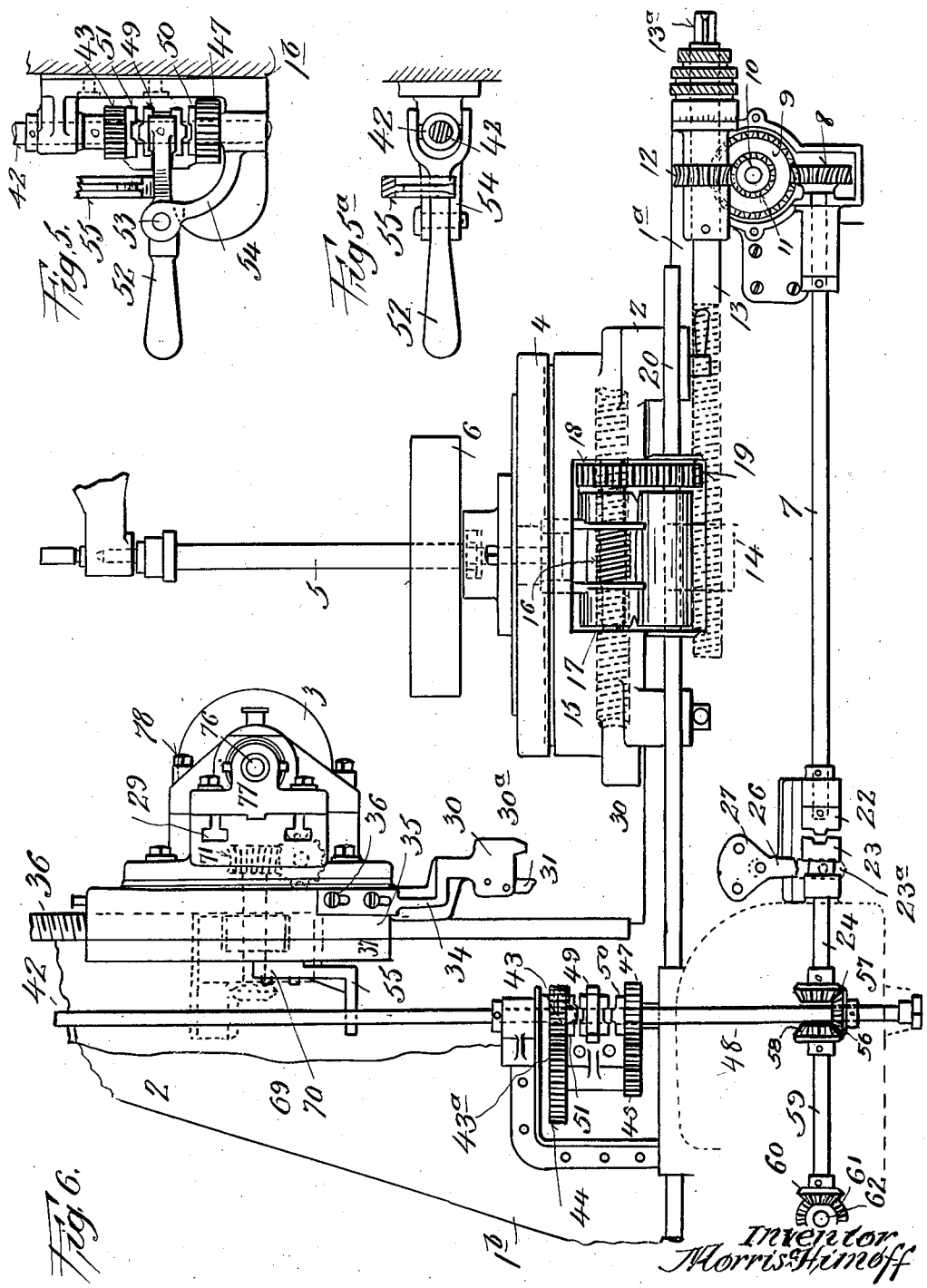

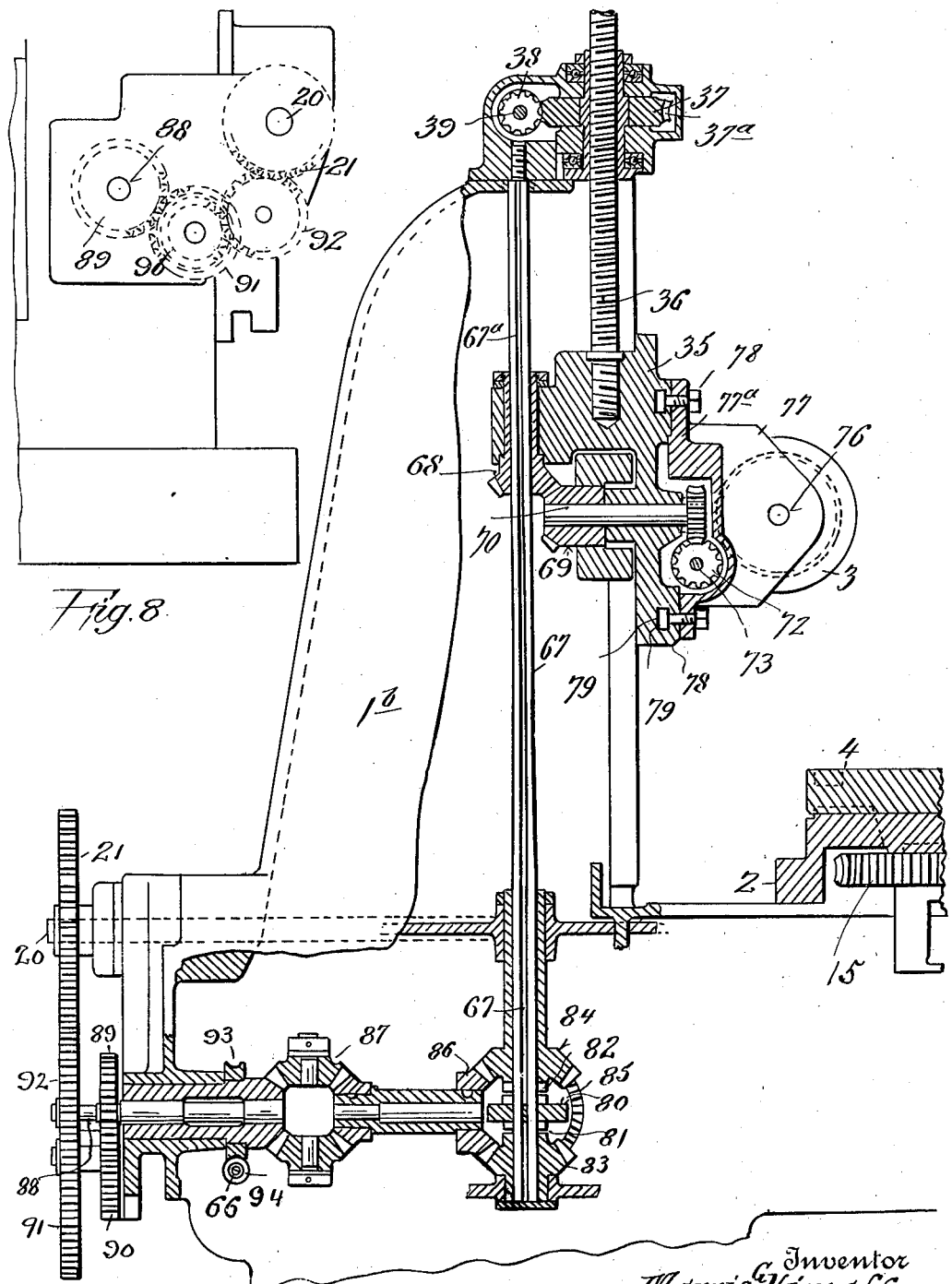

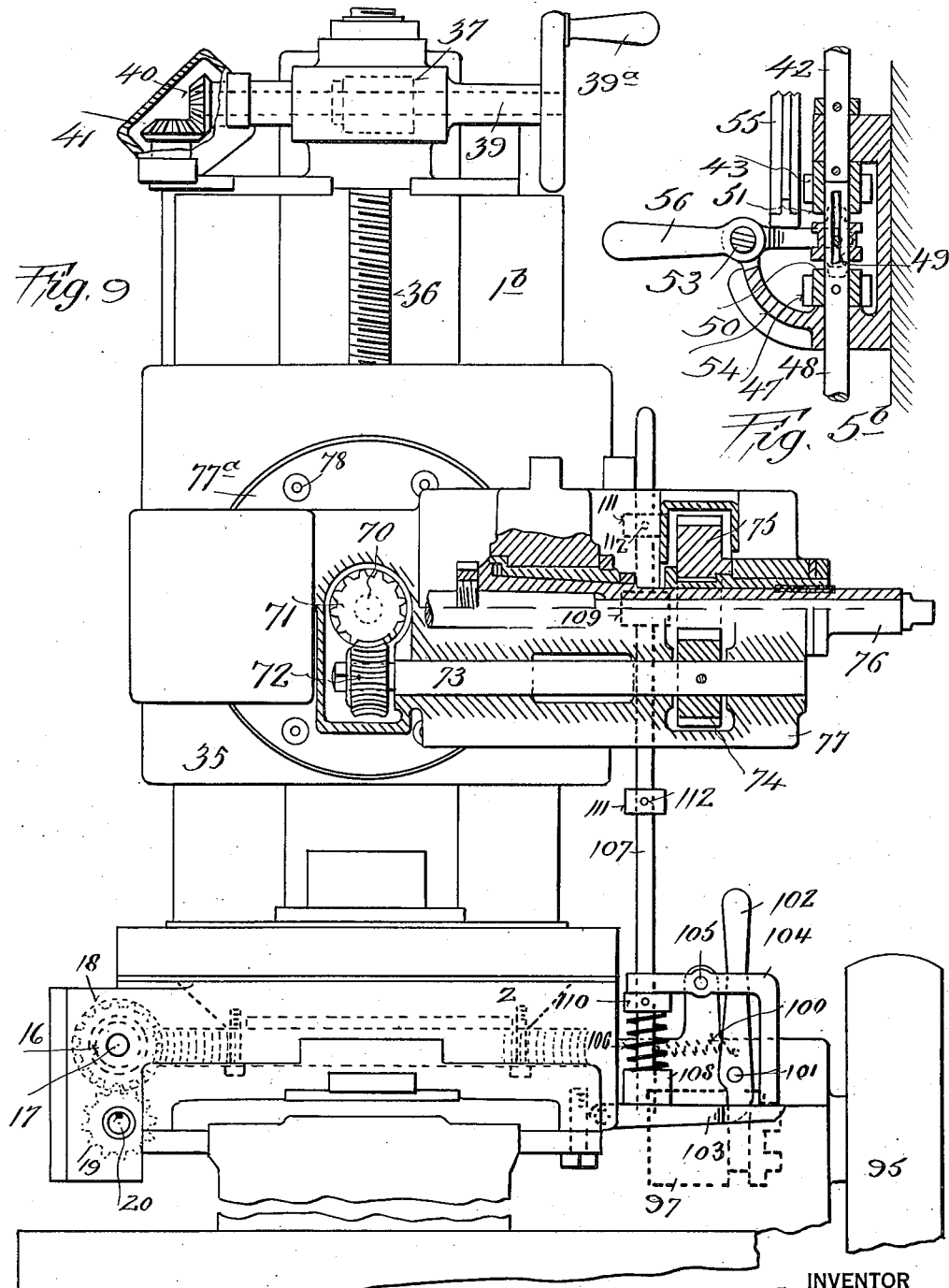

Patented Jan. 6, 1925.

1,522,242

UNITED STATES PATENT OFFICE.

MORRIS G. HIMOFF, OF BROOKLYN, NEW YORK, ASSIGNOR OF ONE-HALF TO MAX HIMOFF, OF NEW YORK, N. Y.

HOBBING MACHINE.

Application filed January 31, 1921. Serial No. 441,110.

*To all whom it may concern:*

Be it known that I, MORRIS G. HIMOFF, a citizen of the United States, and resident of Brooklyn, in the county of Kings and State of New York, have invented certain new and useful Improvements in Hobbing Machines, of which the following is a specification.

My invention relates to improvements in machines for cutting gears and analogous articles, and has for its objects to provide means to automatically move the material being cut away from the hob or cutter as well as to stop the feed of the hob or cutter to said material and return the hob to starting position upon completion of the desired cutting operation.

My invention comprises novel details of improvement and combination of parts that will be more fully hereinafter set forth and then pointed out in the claims.

Reference is to be had to the accompanying drawings forming part hereof, wherein—

Figure 1 is an end elevation, partly in section, of a gear hobbing machine embodying my invention; Fig. 1ª is a partly sectional detail plan view; Fig. 2 is a side view of a portion of the machine; Fig. 3 is an enlarged detail side view; Fig. 4 is a detail perspective view of clutch devices; Fig. 5 is a detail side view illustrating parts shown in Fig. 4; Fig. 5ª is a plan of Fig. 5; Fig. 5ᵇ is a vertical section through Fig. 5; Fig. 6 is a side elevation of part of the machine; Fig. 7 is an enlarged detail section; Fig. 8 is a detail of gearing; Fig. 9 is an enlarged sectional end view.

Similar numerals of reference indicate corresponding parts in the several views.

The numeral 1 indicates the main frame of the machine which may be made of any usual or suitable construction, being shown provided with a bed 1ª upon which a slide 2 is mounted in an ordinary manner, said bed being shown provided with an upright 1ᵇ, supporting the hob or cutter 3. The table 4 is a rotatively mounted upon slide 2 in a usual manner, and is shown provided with an upstanding mandrel or spindle 5 to receive the stock 6 to be cut, although the stock may be otherwise held on table 4. Gearing is provided to cause slide 2 to be operated along bed 1ª as well as to rotate the table 4 to rotate the stock 6 to be cut. In the example illustrated the machine is provided with a shaft 7 journaled in suitable bearings and having a gear 8 in mesh with a gear 9 on shaft 10 having a gear 11 in mesh with a gear 12 on screw 13, (Fig. 1 and 6). The screw 13 receives a nut 14 on slide 2, whereby, through said gearing, when shaft 7 is rotated in the desired direction the slide 2 will be caused to travel along bed 1ª laterally respecting the hob. Screw 13 may be rotated by hand, as by a crank applied to its end 13ª, to adjust the slide to set stock 6 in the desired position for operation thereon of hob 3. Suitable gearing is provided to rotate the table 4 to rotate the stock 6 while being cut by the hob. In the example illustrated the table 4 is provided with a worm wheel 15 (Fig. 1) journaled on slide 2 and in mesh with a worm 16 on a shaft 17 carried by the slide, (Fig. 6), shaft 17 having a gear 18 in mesh with a gear 19 slidably keyed on shaft 20 that slidably receives slide 2 and is journaled in bearings on the main frame. Shaft 20 is driven by gear 21 driven by gearing shown in Figs. 7 and 8.

In order to cause the stock 6 automatically to move away from the hub when the cutting operation on the stock is completed I provide the following devices. A clutch member 22 secured on shaft 7, (Figs. 2, 3 and 6), is adapted to be engaged by a companion clutch member 23 slidably keyed on a shaft 24 journaled on the main frame and provided with a drive gear 57, (Fig. 6). A rock arm or lever 26 is pivotally supported at 27 upon the main frame and operative in an annular groove 23ª in clutch member 23 to shift the latter. The arm 26 is provided with spaced pins or projections 28, 29, to be engaged by an actuator 30 for said arm. Said actuator has a portion 30ª to engage projection 28 and a movable dog 30ᵇ to engage projection 29. Dog 30ᵇ is pivotally supported at 31 on actuator 30 and normally pressed by a spring 32 against a stop 33 on the actuator. When the actuator descends its dog 30ᵇ will engage projection 29 to tilt arm 26 to cause it to shift clutch member 23 into engagement with member 22 to temporarily rotate shaft 7. When said shaft is rotated the gearing 8, 9, 11, 12 will cause shaft 13 in nut 14 to operate slide 2 and table 4 to withdraw stock 6 from the hub 3. Further downward movement of actuator 30 will cause its part 30ª to engage projection 28 to shift arm 26 to uncouple members 22, 23, to stop the rotation of shaft 7. Dog 30ᵇ will tilt against projection 29 when part 30ᵃ engages projection 28. The rearward movement of the table 4 and stock 6 need be only sufficient to withdraw the stock from the hob.

The actuator 30 is caused to move toward and from the projections 28, 29 with the hob. Said actuator is shown carried by a bar 34, attached to slide member 35 that carries the hob, preferably by screws 34ᵃ on member 35 in slots 37 in bar 34, whereby the actuator may be adjusted and set relatively to said projections, (Fig. 6). Slide 35 is guided by suitable ways on upright 1ᵇ and is caused to rise and descend by a screw 36 secured to slide 35 and meshing in threads in a nut 37 journaled on upright 1ᵇ, (Fig. 7). Nut 37 has exterior worm threads 37ᵃ in mesh with a worm 38 carried by shaft 39 journaled in upright 1ᵇ. Shaft 39 may be rotated manually by a crank 39ᵃ to cause slide 35 with the hob to be raised or lowered, as to set the hob with relation to stock 6, and for other purposes. Shaft 39 has a gear 40 in mesh with a gear 41 on an upright shaft 42 journaled in bearings on upright 1ᵇ, (Figs. 1, 2 and 9). Shaft 42 has a gear 43 in mesh with an idle gear 43ᵃ meshing with gear 44 on a shaft having a gear 45 in mesh with a gear 47 on an upright shaft 48 journaled on the main frame in axial relation to and below shaft 42, (Figs. 3 and 6). Shaft 48 through said gearing rotates shaft 42 in one direction by clutch devices and shaft 48 also rotates shaft 42 direct in a reverse direction by clutch devices. A clutch member 49 slidable on and keyed to shaft 48, (Fig. 5ᵇ), is adapted to co-act with a clutch member 50 secured or formed on gear 47, and clutch member 49 is also adapted to co-act with a clutch member 51 secured to or formed on gear 43. Clutch member 49 may be shifted manually to either member 50 or 51 by a lever 52 journaled at 53 on a bracket 54 carried by upright 16, (Figs. 4, 5, and 5ᵇ). An arm 55 is secured to and depends from slide 35, the lower end of which arm extends over lever 52 to cause shifting of clutch member 49, when slide 35 descends, from engagement with clutch member 51 into engagement with clutch member 50 to cause rising of slide 35 with the hob after a cutting operation on the stock. When clutch member 49 is caused to engage clutch member 50 rotation of shaft 42 is caused by gears 47, 45, 44, 43ᵃ and 43, whereby gears 41, 40 and 38 causes rotation of nut 37 to act upon screw 36 to cause slide 35 to rise. The rising and descent of slide 35 with the hob may be stopped as hereafter explained. When the hob is to be used lever 52 may be manually operated to cause clutch member 49 to engage clutch member 51, whereby shaft 48 will be directly coupled with shaft 42 to cause downward feeding of slide 35 and the hob through gearing from shaft 42, in the direction reverse to the rotation of shaft 42 by gearing 47, 45, 44, 43ᵃ and 43.

Shaft 48 is shown provided with a gear 56 in mesh with a gear 57 on shaft 24 and also in mesh with a driving gear 58 on a shaft 59 journaled in the main frame, (Figs. 3 and 6). Shaft 59 is shown provided with a gear 60 in mesh with a gear 61 on shaft 62 journaled in the main frame. Shaft 62 has a gear 63 in mesh with an idle gear 64 that meshes with a gear 65 on shaft 66 journaled in the main frame, (Figs. 3 and 7). When shaft 59 is rotated the shafts 24 and 48 will be correspondingly rotated to transmit rotation to shafts 7 and 42 as may be required.

To rotate hob 3 the following arrangement is provided:—A shaft 67 is journaled in the main frame spaced from screw 36, (Fig. 7), and is shown provided with a longitudinal groove or keyway 67ᵃ receiving a key from a bevel gear 68 slidable along shaft 67 and journaled in a bearing on slide 35. Gear 68 is in mesh with a gear 69 carried by shaft 70 journaled on slide 35 and provided with a gear 71 in mesh with a gear 72 secured upon shaft 73 journaled on slide 35, (Figs. 7 and 9). Shaft 73 carries a gear 74 in mesh with a gear 75 secured upon the hob spindle 76, (Fig. 9). Shaft 73 and spindle 76 are journaled upon a bracket or support 77 having a portion 77ᵃ fitted rotatively adjustable on slide 35 at the axis of shaft 70 to be held rigidly against slide 35 in adjusted position by means of bolts 78 having their heads received in annular groove 79 in slide 35, in an ordinary manner, (Fig. 7), whereby the position of hob may be set in accordance with the stock 6 to be cut. A clutch member 80 slidably keyed on shaft 67 is adapted to engage clutch members 81, 82, respectively carried by gears 83, 84, loosely journaled on shaft 67 and in mesh with a main drive gear 85 on shaft 85ᵃ, (Figs. 1ᵃ and 7). When clutch member 80 is moved into engagement with clutch member 81 the shaft 67 will be rotated in one direction for causing operation of hob 3 and the gearing, and when clutch member 80 is in engagement with clutch member 82 the shaft 67 will be driven in a reverse direction to correspondingly rotate the hob and gearing, (Fig. 7). The gears 83, 84, are in mesh with a gear 86 connected with a differential gearing indicated at 87, whose shaft 88 is journaled in suitable bearings on the main frame, (Fig. 7). Shaft 88 has a gear 89 in mesh with gear 90 having a companion gear 91 in mesh with an idle gear 92 that meshes with gear 21 for rotating shaft 20, (Figs. 7 and 8). The differential 87 has a worm wheel 93 in mesh with worm 94 on shaft 66 for rotating the latter to drive shafts 24 and 48. The shaft 85ª of gear 85, (Fig. 1ª), carries a gear 85ᵇ in mesh with a gear 95ª loose on shaft 95ᵇ of drive pulley 95. Gear 95ª is provided with a clutch member 96 adapted to be engaged by a clutch member 97 keyed slidably on shaft 95ᵇ. Clutch arm 99, (Fig. 1ª), cooperates with clutch member 97 to shift it and is normally drawn by a spring 100 to uncouple the clutch. Arm 99 is secured upon a rock shaft 101 journaled on the main frame and provided with a starting lever 102 whereby it my be moved in opposite directions, (Figs. 1, 1ª and 9). A latch member 103 pivoted on the main frame is adapted to retain the starting lever 102 with clutch members 97, 96, in engagement for direct driving of shafts 42 and 67 to cause lowering of the hob and its rotation for cutting stock 6. A trip lever 104 pivoted at 105 is adapted to engage latch member 103 to retain starting lever 102 in set position with clutch members 96, 97 engaged. A spring 106 cooperates with a slidable rod 107 guided on the frame at 108 and at 109 on slide 35, (Fig. 9). Spring 106 engages a stop 110 on rod 107 to sustain the rod and raise it, which stop engages the under side of the forked end of trip lever 104 that receives rod 107. Rod 107 rests on latch member 103. Adjustable stops 111 on rod 107 on opposite sides of bearings 109, (Fig. 9), may be secured in set spaced relation on rod 107 by means of screws 112. When slide 35 descends with the hob so that the cutting of stock 6 has been completed the bearing 109 will engage the lower stop 111 on rod 107 to push down the latter to cause latch 103 to release the starting lever and spring 100 will cause clutch member 97 to disengage from cutch member 96 and stop the descent of the slide. When the slide is to rise the clutch members 96, 97 will be moved into engagement and the starting lever will be reset and retained by latch member 103, and during the rise of the slide, by the operation of gears 47, 45, 44, 43ª, 43, bearing 109 will engage the upper stop 111 of rod 107 and the trip lever 104 will be operated to cause latch member 103 to release starting lever 102 to disengage clutch members 96, 97, to stop the machine when the slide has reached the desired height. When the machine is to be operated the slide 35 is suitably elevated, the stock is placed upon table 4, lever 52 is manually operated to engage cutch members 49 and 51, and the machine is started by setting the starting lever 102 to engage clutch members 96 and 97. As shaft 42 is rotated the slide 35 and the hob will be fed downwardly, and as shaft 67 is rotated the hob will be rotated to cut stock 6, table 4 being simultaneously rotated from shaft 20, so that by the time the hob has made the required descent along the stock the teeth on the latter will be cut to form a gear according to the character of the hob. When the hob has completed its work on the gear the dog 30ᵇ will shift arm 26 to cause clutch members 22 and 23 to engage, whereupon shaft 7 will be rotated to cause slide 2 to be moved to retract stock 6 from the hob, and continued descent of slide 35 will cause the actuator portion 30ª to engage projection 28 and tilt arm 26 to uncouple clutch members 22, 23. After clutch members 22, 23 have been uncoupled the arm 55 will operate lever 52 to shift cutch member 49 from clutch member 51 to clutch member 50, whereby shaft 48 through gears 47, 45, 44, 43ª and 43 will cause reverse rotation of shaft 42 to cause elevation of slide 35 and the hob to an upper position for cutting new stock on table 4 after the starting lever has been reset, said lever having been automatically operated to uncouple clutch members 96, 97 when slide 35 completed its downward travel.

Having now described my invention, what I claim is:—

1. A gear hobbing machine comprising a frame, a rotative table for the stock, a slidable support for the table, means to rotate the table, a slide movable relatively to the table, a hob support carried by the slide, means to feed the slide and hob support for cutting the stock, means to actuate said support, gearing to operate the table support including clutch members, a shifter for one of the clutch members, and an actuator operative with the slide and provided with a dog to operate the shifter in one direction and a projection to operate the shifter in another direction to engage and disengage said clutch members.

2. A gear hobbing machine comprising a frame, a rotative table for the stock, a slidable support for the table, gearing to rotate the table, gearing to operate said support, a slide having a support for a hob, gearing to operate the slide in opposite directions, and means controlled by the slide on one of its movements to cause operation of said slidable support operating gearing to retract the table from the hob and to stop the movement of the slide automatically.

3. A gear hobbing machine comprising a frame, a rotative table for the stock, a slidable support for the table, gearing to rotate the table, gearing to operate said support including complemental clutch members, a slide having a support for a hob, gearing to operate the slide in opposite directions including complemental clutch members, and means controlled by the slide to actuate the first named clutch members upon one movement of the slide to cause retraction of the table from the hob and to stop movement of the slide.

4. A gear hobbing machine comprising a frame, a rotative table for the stock, a slidable support for the table, gearing to rotate the table, gearing to operate said support including complemental clutch members, a slide having a support for a hob, gearing to operate the slide in opposite directions including two shafts each having a gear and clutch member, a complemental clutch member slidable on and rotative with one of said shafts, gearing connecting said gears, and means controlled by the slide to actuate the respective complemental clutch members to cause operation of the respective gearing.

5. A gear hobbing machine comprising a frame, a rotative table for the stock, a slidable support for the table, gearing to rotate the table, gearing to operate said support including complemental clutch members, a slide having a support for a hob, gearing to operate the slide in opposite directions including two shafts each having a gear and clutch member, a complemental clutch member slidable on and rotative with one of said shafts, gearing connecting said gears, a shifter for each complemental clutch member, an actuator carried by the slide to operate one of said shifters in opposite directions, and a projection carried by the slide to actuate the other shifter.

6. A gear hobbing machine comprising a frame, a rotative table for the stock, a slidable support for the table, means to rotate the table, a slide movable relatively to the table, a hob support carried by the slide, means to feed the slide and hob support for cutting the stock, means to actuate said support, means to automatically retract the stock from the hob upon completion of the cutting operation, gearing carried by the slide to operate the hob support, a shaft slidably receiving one of said gears and keyed thereto, a drive gear, two loose gears meshing therewith having clutch members, and a complemental clutch member slidably keyed to said shaft to engage either of said clutch members.

7. A gear hobbing machine comprising a frame, means to support stock, a slide movable relatively to the stock support and having a support for a hob, means to operate the hob support, means to feed the slide to the work, means to retract the stock support from the hob, a drive gear, means to operate said gear including clutch members, means to retain the clutch members out of engagement, and means controlled by the slide to release said retaining means.

8. A gear hobbing machine comprising a frame, means to support stock, a slide movable relatively to the stock support and having a support for a hob, means to operate the hob support, means to feed the slide to the work, means to retract the stock support from the hob, a drive gear, means to operate said gear including clutch members, a lever connected with one of said clutch members, means to release the clutch members, a latch member to retain said lever, and a rod controlled by the slide to actuate the latch member to release said lever.

9. A gear hobbing machine comprising a frame, means to support stock, a slide movable relatively to the stock support and having a support for a hob, means to operate the hob support, means to feed the slide to the work, means to retract the stock support from the hob, a drive gear, means to operate said gear including clutch members, a lever connected with one of said clutch members, means to release the clutch members, a latch member to retain said lever, a trip lever to operate the latch member, a rod adapted to operate said member in one direction of movement and to operate the trip lever in another direction of movement, and means cooperative between the slide and rod to actuate the latter upon different movements of the slide.

Signed at New York, in the county of New York and State of New York, this 24 day of Jan. A. D. 1921.

MORRIS G. HIMOFF.